(12) United States Patent
Chaubet et al.

(10) Patent No.: US 10,464,012 B2
(45) Date of Patent: Nov. 5, 2019

(54) PROCESS AND PLANT FOR THE PURIFICATION OF RAW GASES BY MEANS OF PHYSICAL GAS SCRUBBING

(71) Applicant: L'Air Liquide, Societe Anonyme pour l'Etude et l'Exploitation des Procedes Georges Claude, Paris (FR)

(72) Inventors: Lucie Chaubet, Frankfurt am Main (DE); Marc Wagner, Saint Maur des Fosses (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 67 days.

(21) Appl. No.: 15/546,311

(22) PCT Filed: Jan. 19, 2016

(86) PCT No.: PCT/EP2016/025002
§ 371 (c)(1),
(2) Date: Jul. 26, 2017

(87) PCT Pub. No.: WO2016/120018
PCT Pub. Date: Aug. 4, 2016

(65) Prior Publication Data
US 2018/0028961 A1 Feb. 1, 2018

(30) Foreign Application Priority Data
Jan. 30, 2015 (DE) .......... 10 2015 101 415

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1462* (2013.01); *B01D 53/1493* (2013.01);
(Continued)

(58) Field of Classification Search
CPC .......... B01D 53/14; B01D 53/18; C09K 5/04; C01B 3/52
See application file for complete search history.

(56) References Cited

U.S. PATENT DOCUMENTS 4,324,567 A * 4/1982 Ranke .................. B01D 53/14
95/161
4,430,316 A 2/1984 Ranke et al.
(Continued)

OTHER PUBLICATIONS

International Search Report and Written Opinion for PCT/EP2016/025002, dated Jun. 10, 2016.
German Wikipedia, "Kompressionskaltemaschine," https://de.wikipedia.org/w/index.php?title=Kompressionskaltemaschine&oldid=162135948, (Machine translation), 9 pages.

*Primary Examiner* — Youngsul Jeong
(74) *Attorney, Agent, or Firm* — Justin K. Murray

(57) ABSTRACT

A process for separating undesired, in particular acidic gas constituents from a raw gas, in particular raw synthesis gas, by absorption with cold methanol as physical detergent, wherein the methanol is cooled in a compression refrigeration machine by using a multi-component coolant. The use of the coolant according to the invention provides significant advantages with regard to the compressor capacity required in the compression refrigeration machine for the provision of a defined cooling capacity.

7 Claims, 1 Drawing Sheet

(51) Int. Cl.
  *C09K 5/04* (2006.01)
  *C01B 3/52* (2006.01)
  *F25J 3/08* (2006.01)

(52) U.S. Cl.
  CPC ............... *B01D 53/18* (2013.01); *C01B 3/52* (2013.01); *C09K 5/042* (2013.01); *F25J 3/08* (2013.01); *B01D 2252/2021* (2013.01); *B01D 2256/16* (2013.01); *B01D 2257/304* (2013.01); *B01D 2257/504* (2013.01); *C01B 2203/0415* (2013.01); *C01B 2203/0475* (2013.01); *C01B 2203/0485* (2013.01); *C09K 2205/12* (2013.01); *F25J 2205/50* (2013.01); *F25J 2220/66* (2013.01); *F25J 2270/12* (2013.01); *Y02P 20/152* (2015.11)

(56) References Cited

U.S. PATENT DOCUMENTS

| | | | | |
|---|---|---|---|---|
| 6,268,317 | B1* | 7/2001 | Kawakami | C08G 64/0208 |
| | | | | 252/67 |
| 2006/0162378 | A1* | 7/2006 | Roberts | C09K 5/042 |
| | | | | 62/612 |
| 2012/0286193 | A1* | 11/2012 | Maruya | C09K 5/042 |
| | | | | 252/67 |

* cited by examiner

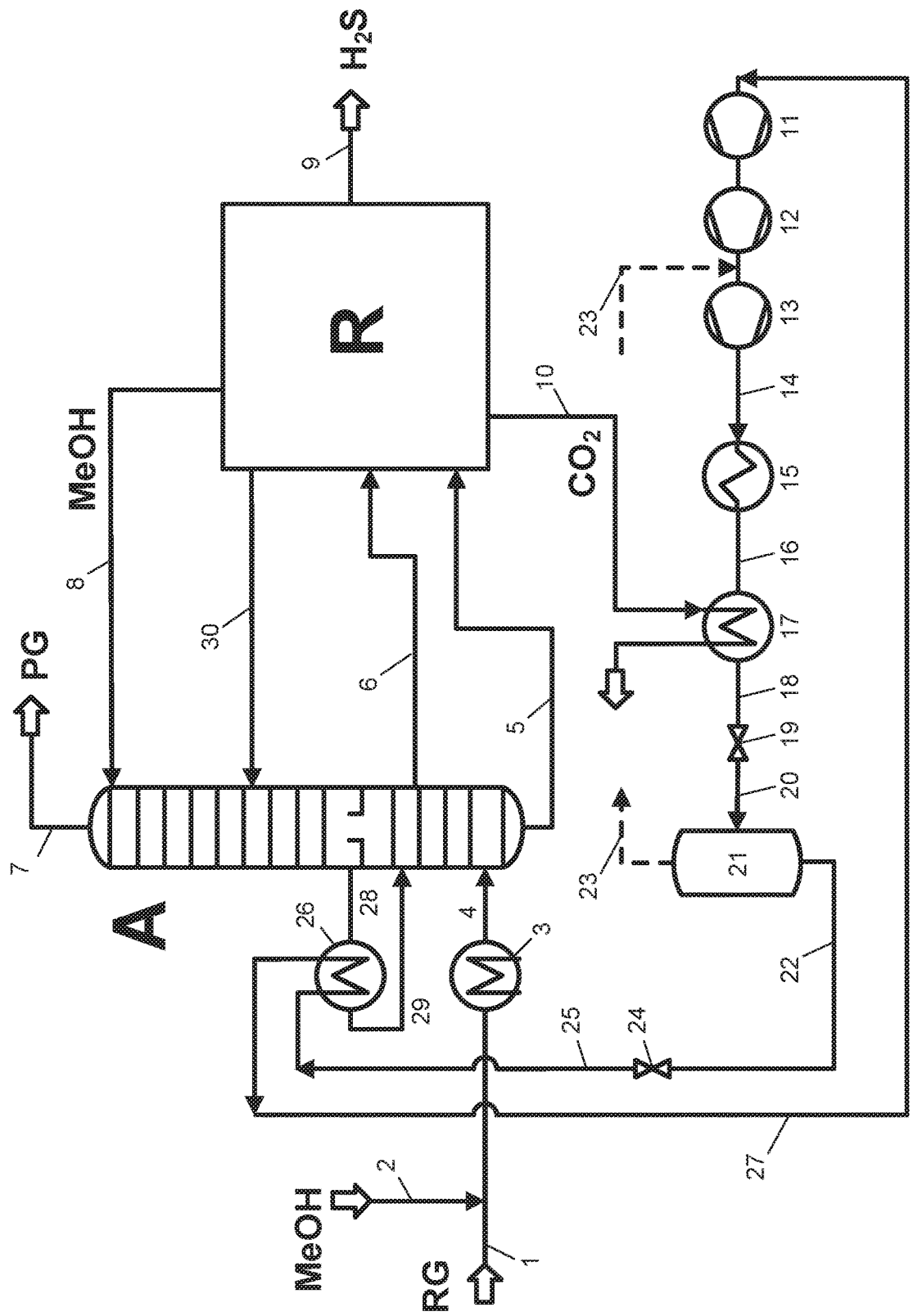

PROCESS AND PLANT FOR THE PURIFICATION OF RAW GASES BY MEANS OF PHYSICAL GAS SCRUBBING

CROSS REFERENCE TO RELATED APPLICATIONS

This application is a § 371 of International PCT Application PCT/EP2016/025002, filed Jan. 19, 2016, which claims the benefit of DE 10 2015 101415.7, filed Jan. 30, 2015, both of which are herein incorporated by reference in their entireties.

FIELD OF THE INVENTION

This invention relates to a process for separating undesired, in particular acidic gas constituents, for example carbon dioxide and hydrogen sulfide, from a raw gas, in particular raw synthesis gas, by absorption with cold methanol as physical detergent, wherein the methanol is cooled in a compression refrigeration machine by using a novel coolant.

The invention also relates to a coolant composition and furthermore to a plant for carrying out the process.

BACKGROUND

Processes for separating undesired accompanying substances from technical raw gases by means of physical absorption or gas scrubbing are well known from the prior art. With such processes undesired, acidic constituents from raw synthesis gases generated by gasification or reformation of carbonaceous feedstocks, for example carbon dioxide ($CO_2$) and hydrogen sulfide ($H_2S$), but also further constituents such as carbonyl sulfide (COS) and hydrogen cyanide (HCN), can safely be removed from the desired synthesis gas constituents hydrogen ($H_2$) and carbon monoxide (CO) down to trace amounts. A known and frequently applied process is the Rectisol process, which is described in principle in Ullmann's Encyclopedia of Industrial Chemistry, 6th Edition, Vol. 15, p. 399 ff. In the Rectisol process, the absorption of the above-mentioned undesired disturbing components is effected by cold methanol as absorbent or detergent, i.e. methanol cooled down significantly below ambient temperature, wherein in an absorber column an intensive mass transfer between the raw gas and the detergent is effected. The solubility of the undesired gas constituents drastically increases with decreasing temperature of the methanol and with increasing pressure, while it remains virtually constant for hydrogen and carbon monoxide. Methanol also has the advantage that even at temperatures down to −75° C. it still has a low viscosity and thus good mass and heat transfer properties.

In the Rectisol process, the methanol loaded with the disturbing components, which is used as absorbent, is circulated via regeneration plants. In the regeneration plants, the loaded methanol is liberated from the absorbed gases in a physical way. In a first regeneration step $CO_2$ is removed from the loaded methanol absorbent by depressurization and/or stripping with a gas, for example nitrogen. In a second regeneration step the sulfur-containing gases, COS and $H_2S$, are expelled by heating. It frequently is aimed to produce a COS/$H_2S$ gas largely free from $CO_2$, as its economically interesting further processing is impaired by mixing with $CO_2$.

In the Rectisol process, a distinction is made between the standard process and the selective Rectisol process. In the standard Rectisol process, the accompanying gases COS/$H_2S$ and the $CO_2$ jointly are separated from the raw synthesis gas in one absorption step. In the so-called selective Rectisol process, the sulfur-containing accompanying gases COS/$H_2S$ and the $CO_2$ each are separated from the raw synthesis gas in separate absorption steps proceeding one after the other. This selective absorption becomes possible by suitable adjustment of the process parameters, in particular the quantity ratio of absorbent and gas to be absorbed. The advantage of the selective absorption consists in that the COS/$H_2S$ gas and the $CO_2$ gas for the most part already are kept separate during the absorption and only the smaller part must be separated during the regeneration of the methanol.

After passing through mostly several regeneration steps, several partial streams of the methanol liberated from the disturbing components are recirculated to the absorber column. To introduce the required cold into the absorber column, a partly loaded methanol partial stream is guided out of the absorber column, cooled by indirect heat exchange with a coolant in a heat exchanger arranged outside the absorber column, and subsequently recirculated into the absorber column. Cooling of the coolant is effected in a compression refrigeration machine with mostly several compressor stages. Useful coolants include substances such as ammonia or propylene, as it is taught in the German Wikipedia article "Kompressionskältemaschine", retrieved on 20 Jan. 2015.

When using propylene as coolant under typical operating conditions, temperatures of −44° C. are achieved on the coolant side and −25 to −35° C. on the methanol detergent side.

Since cooling of the detergent represents a significant energy consumer within the Rectisol process, efforts for the energetic optimization of this process also must consider the generation of cold.

SUMMARY OF THE INVENTION

It therefore is the object of the invention to provide a process which constitutes an improvement of the process known from the prior art in particular with regard to the energy consumption. This object substantially is solved by a process with the features of claim 1:

A process for the separation of undesired gas constituents, in particular carbon dioxide and hydrogen sulfide, from a raw gas, in particular raw synthesis gas, with methanol as detergent, comprising the following steps:

a) supplying the raw gas to the absorption apparatus, b) cooling a methanol partial stream withdrawn from the absorption apparatus by indirect heat exchange with a coolant in a heat exchanger arranged outside an absorption apparatus and recirculating the cooled methanol partial stream into the absorption apparatus, wherein the coolant is cooled in a compression refrigeration machine which includes at least one compression stage, c) contacting the raw gas with the cooled methanol partial stream and with at least one further methanol partial stream recirculated from downstream process stages in the absorption apparatus, wherein a process gas stream depleted of undesired gas constituents and a loaded methanol partial stream enriched in undesired gas constituents is obtained, d) multistage regeneration of the loaded methanol partial stream by pressure decrease and/or temperature increase, between which or downstream of which optionally further absorption steps for the separation of further undesired gas constituents from the process gas stream can be carried out, wherein at least one regenerated methanol partial stream is obtained, which is recirculated to step c), and wherein gas streams containing carbon dioxide and hydrogen sulfide are obtained, which are removed from the process, wherein the coolant consists of a substance mixture comprising propylene and at least one further substance.

The object furthermore is solved by a coolant composition according to the invention and a plant for carrying out the process according to the invention:

A coolant composition for use in a process for the separation of undesired gas constituents, in particular carbon dioxide and hydrogen sulfide, from a raw gas, in particular raw synthesis gas, with methanol as detergent, containing 5 to 15 mol-% ethylene, 5 to 15 mol-% n-butane, 30 to 40 mol-% propane and 30 to 60 mol-% propylene.

A plant for the separation of undesired gas constituents, in particular carbon dioxide and hydrogen sulfide, from a raw gas, in particular raw synthesis gas, with methanol as detergent, comprising the following plant sections:

- at least one absorption apparatus for the separation of undesired gas constituents from a raw gas with methanol as detergent,
- at least one regeneration apparatus for producing regenerated or partly regenerated partial streams of the methanol detergent,
- conduits and conveying devices for setting up one or more circuits of the methanol detergent, wherein the methanol detergent passes all absorption or regeneration apparatuses,
- conduits for supplying and discharging process gas streams to and from the absorption or regeneration apparatuses,
- conduits for supplying the raw gas and for discharging the process gas stream depleted of undesired gas constituents and at least one gas stream containing carbon dioxide and hydrogen sulfide,
- a compression refrigeration machine including at least one compression stage,
- at least one counterflow heat exchanger for cooling a methanol partial stream by indirect heat exchange with a coolant, wherein the coolant is cooled in the compression refrigeration machine, wherein the coolant consists of a substance mixture comprising propylene and at least one further sub stance.

Further aspects of the process according to the invention, the coolant composition and the plant are to be found in the sub-claims.

In process step c) of the process according to the invention, contacting is understood to be the joining of the raw gas stream with the methanol partial streams under the conditions of the intensive mass transfer in the absorption apparatus. The term does not necessarily comprise the first contact of the raw gas with the methanol detergent, which can be effected already in the supply conduit to the absorption apparatus, if raw gas and methanol are charged to the absorption apparatus via a common conduit.

The absorption apparatus preferably is designed as absorption column. Other absorption apparatuses also are possible, but are preferred less. Most frequently, the absorption column is configured as tray column.

Methods for regenerating the methanol detergent, i.e. liberating the same from the separated disturbing components, are well known to the skilled person. They are described in detail in the above-mentioned prior art and comprise processes such as stripping with steam or inert gases, for example nitrogen, pressure decrease (depressurization, flashing) or hot regeneration, as well as arbitrary combinations of these processes.

The invention is based on the finding that the heat transfer between the methanol detergent and the coolant does not proceed optimally in the processes known from the prior art. These processes utilize a one-component coolant, typically ammonia or propylene, which evaporate under defined pressure conditions at a constant temperature. In the temperature profile of the heat exchanger used for cooling the methanol detergent, the temperature of the coolant accordingly remains at a constant level in dependence on the location coordinate, while the temperature of the methanol mostly guided through the heat exchanger in counterflow to the coolant varies steadily and decreases in direction of the exit of the methanol from the heat exchanger.

During the use of the multi-component coolant according to the invention, its evaporation temperature on the other hand changes continuously upon passing through the heat exchanger, unless there is an azeotropic composition. In this connection, reference also is made to coolants with temperature glide. The course of the temperature profile of the methanol passing through the heat exchanger thus is approached better, whereby the mean temperature difference along the exchange surface and thus the heat flow between the two media is increased. Correspondingly, a defined temperature decrease can be achieved with less energy expenditure.

BRIEF DESCRIPTION OF THE DRAWINGS

Further features, advantages and possible applications of the invention result from the subsequent description of the drawings and the exemplary embodiments. In this case, all described and/or pictorially presented features, alone or in any combination, are the subject matter of the invention, independently of the summary thereof in the claims and the dependency reference thereof.

The FIGURE shows a flow diagram of an exemplary aspect of the process according to the invention and the plant according to the invention

DETAILED DESCRIPTION OF THE INVENTION

A preferred aspect of the invention is characterized in that the coolant and the methanol partial stream in counter flow pass the heat exchanger used in process step 11 b). In this way, the advantageous effects of the multi-component coolant set forth above are fully exploited, and a particularly high heat transfer between coolant and methanol detergent is obtained.

It was found to be particularly advantageous when the multi-component coolant contains ethylene, n-butane, propane and propylene. In particular a coolant composition which contains 5 to 15 mol-% ethylene, 5 to 15 mol-% n-butane, 30 to 40 mol-% propane and 30 to 60 mol-% propylene has particularly favorably properties as compared to the cooling of methanol with the one-component coolant propylene. All of said components have a low hazard potential and are not toxic. In the case of a possible conversion to the operation with a multi-component coolant, it merely is necessary to provide the logistics for the three additional components, when previously propylene has already been used as one-component coolant. Particularly favorable operating experience has been gained with a coolant composition which contains 10 mol-% ethylene, 10 mol-% n-butane, 35 mol-% propane and 45 mol-% propylene, as will be set forth in a succeeding numerical example.

In a preferred aspect of the process according to the invention, the compression refrigeration machine includes three compression stages in which a compression of the vaporous coolant is effected. Such compressor arrangement has proven its worth in the art and has a favorable cost-benefit relation.

In a particularly favorable aspect of the process according to the invention and the plant according to the invention, the compressed coolant vapor is condensed in a first cooling stage by indirect heat exchange, e.g. against cooling water, and the condensate is subcooled in a second cooling stage by indirect heat exchange against a cold carbon dioxide gas stream obtained according to process step 1 d). This configuration is particularly favorable in energetic terms and utilizes the cold of the carbon dioxide gas stream obtained. The latter is heated before it is discharged to the environment, whereby e.g. condensation phenomena in or at the discharge system are avoided.

Preferably, the subcooled condensate is evaporated or partly evaporated in at least one evaporation stage, wherein by adiabatic temperature decrease a further cooling of the coolant vapor obtained is effected and the coolant vapor thus cooled down further is used for cooling the methanol partial stream in process step 11 b). By evaporating once again, a further cooling of the coolant to the required low temperature is effected, before the heat exchange with the methanol detergent is effected.

In a further aspect of the invention, the plant according to the invention comprises at least two cooling stages, wherein the compressed coolant vapor is condensed in the first cooling stage by indirect heat exchange, e.g. against cooling water, and the condensate is subcooled in a second cooling stage by indirect heat exchange against a carbon dioxide gas stream obtained according to process step 11 d). As explained in connection with the corresponding aspect of the process according to the invention, this configuration is particularly favorable in energetic terms and utilizes the cold of the carbon dioxide gas stream obtained. The latter is heated, before it is discharged to the environment.

Exemplary Embodiment

Further features, advantages and possible applications of the invention can also be taken from the following description of an exemplary embodiment and numerical example as well as the drawing. All features described and/or illustrated form the subject-matter of the invention per se or in any combination, independent of their inclusion in the claims or their back-reference.

In the design of the process according to the invention and the plant according to the invention as schematically shown in the FIGURE, raw gas (RG), in this case raw synthesis gas, which has been produced by reformation or gasification of carbonaceous feedstocks in an upstream, non-illustrated synthesis gas production plant, is introduced into the gas scrubbing process via conduit 1. Beside the desired synthesis gas constituents hydrogen and carbon monoxide, the raw synthesis gas also contains the undesired acidic synthesis gas constituents carbon dioxide and hydrogen sulfide. A small amount of methanol is introduced into conduit 1 via conduit 2, so that the downstream heat exchanger 3 is not blocked by the formation of ice due to residual moisture contained in the raw gas. The resulting mixed condensate is discharged and supplied to the processing unit (not illustrated).

In the heat exchanger 3, the raw gas stream is precooled to temperatures of −5 to 0° C. by indirect heat exchange against the process gas leaving the absorber column and/or against a cold $CO_2$ waste gas stream and is introduced into the lower part of the absorber column A via conduit 4. The absorber column is designed as tray column and in a manner known per se constructed in two parts, wherein in the lower column part located below the separation tray a selective separation of $H_2S$ is effected by means of a small amount of methanol detergent. Via conduit 5, the bottom product stream loaded with $H_2S$ is supplied to the multistage regeneration R which likewise is known from the prior art and therefore here only is represented as function block.

In the part of the absorber column A located above the separation tray, the separation of $CO_2$ from the raw gas is effected by addition of a first methanol partial stream supplied via conduit 8 in the vicinity of the column head ($CO_2$ fine wash) and by addition of a second methanol partial stream supplied via conduit 30 in the vicinity of the column center ($CO_2$ main wash). A methanol partial stream loaded with $CO_2$ is discharged from the absorber column A via conduit 28, in the counterflow heat exchanger 26 cooled to temperatures of −25 to −35° C. by indirect heat exchange against the coolant according to the invention, and via conduit 29 recirculated into the part of the absorber column A located below the separation tray, where it serves as detergent for the removal of $H_2S$.

From the part of the absorber column A located below the separation tray, a further methanol partial stream loaded with $CO_2$ and $H_2S$ is discharged via conduit 6 and supplied to the multistage regeneration R.

As overhead product of the absorber column, a process gas stream PG depleted of $CO_2$ and $H_2S$ is obtained and discharged from the absorber via conduit 7. Thereafter, it can optionally be supplied to further purification and conditioning steps. Furthermore, it is used as coolant in the heat exchanger 3 (not illustrated).

As already explained above, the multistage regeneration R is known per se from the prior art. It can comprise stripping with steam or inert gases, for example nitrogen, a pressure decrease (depressurization, flashing) or a hot regeneration, as well as arbitrary combinations of these processes. The objective is to produce a $H_2S$ waste gas largely free from $CO_2$, as its economically interesting further processing is impaired by mixing with $CO_2$. It is discharged from the multistage regeneration R via conduit 9. Subsequently, it mostly is supplied to a sulfur recovery plant, which for example operates by the Claus process.

The $CO_2$ waste gas stream obtained in the multistage regeneration R is discharged via conduit 10 and subsequently supplied to a consumer or discharged to the environment.

As further product streams of the multistage regeneration R several methanol partial streams with different load of disturbing components are obtained. For reasons of simplification, only two of these partial streams are shown in the FIGURE, wherein they are recirculated to the absorber column A via conduits 8 and 30, respectively.

The coolant required for cooling the methanol detergent in the heat exchanger 26 contains 10 mol-% ethylene, 10 mol-% n-butane, 35 mol-% propane and 45 mol-% propylene. In a compression refrigeration machine, it is cooled to the required low temperature. For this purpose, the coolant vapor initially is compressed in the three compressor stages 11, 12, 13 to a pressure of 18.1 bar proceeding from 1.25 bar. (All pressure values are understood to be absolute pressures, unless indicated otherwise in the individual case.) Via conduit 14, the compressed coolant vapor is charged to the cooler 15, where it is condensed by means of cooling water.

Via conduit 16, the condensed coolant is charged to the heat exchanger 17 as saturated liquid and in said heat exchanger subcooled by indirect heat exchange against the cold $CO_2$ waste gas stream supplied from the multistage regeneration R via conduit 10. The heated $CO_2$ waste gas stream then is discharged to the environment via a chimney, wherein due to heating the condensation of the air moisture in or at the waste gas path of the $CO_2$ is reduced.

Via conduit 18, the subcooled coolant is supplied to the expansion valve 19 and depressurized in the same to a pressure of 6.5 bar. Via conduit 20, the partly depressurized coolant is supplied to the phase separation device 21, in which the vaporous fraction of the coolant is separated and recirculated to the compression via conduit 23. Via conduit 22, the liquid fraction of the coolant is supplied to a further expansion valve 24 and depressurized there to a pressure of 1.25 bar. This corresponds to a coolant temperature of −44° C. In the technical realization, the depressurization at the expansion valve 24 can be carried out in several stages, wherein the last partial depressurization and evaporation of the coolant is effected in the heat exchanger 26, to which the coolant is supplied via conduit 25. The heat exchanger 26 is designed as counterflow heat exchanger. In the same, the evaporation of the coolant mixture is effected over a temperature interval by indirect heat exchange against the methanol partial stream supplied via conduit 28. By using the described coolant mixture, as already explained above, the course of the temperature profile of the methanol or raw gas passing through the heat exchanger is approached better, whereby the mean temperature difference along the exchange surface and thus the heat flow between the two media is increased. Correspondingly, a defined temperature decrease can be achieved with less energy expenditure.

The coolant evaporated in the heat exchanger 26 is recirculated to the compression via conduit 27 and is available there for a new cooling cycle.

Numerical Example

In the Table shown below, the powers required for the individual compressor stages as well as the required cooling water quantities in the cooler 15 are compared with each other for two cases in which on the one hand propylene is used as pure coolant and on the other hand a coolant mixture is used, containing 10 mol-% ethylene, 10 mol-% n-butane, 35 mol-% propane and 45 mol-% propylene. The boundary condition was that in the heat exchanger 26 a constant cooling capacity is to be provided.

In both examples, the pressures after the individual compressor stages were 2.5 bar (stage 1), 6.5 bar (stage 2) and 18.1 bar (stage 3). When using propylene as pure coolant, the expansion pressure in the heat exchanger 26 was 1.05 bar, and when using the coolant mixture according to the invention it was 1.25 bar.

It can clearly be seen that the use of the coolant mixture according to the invention provides energetic advantages with regard to the compressor capacity required for a certain cooling capacity. Thus, a total of 11% of the compressor capacity are saved. Furthermore, the mass flow (molar flow rate) of the coolant is reduced by 4.9% and the required cooling water quantity is reduced by 4.7%.

TABLE 1

Compressor capacity and cooling water quantity when using a pure coolant or a coolant mixture (claim 9) with constant cooling capacity

| Compressor capacity/kW | Propylene coolant (Comp. ex.) | Coolant mixture (Invention) |
| --- | --- | --- |
| Stage 1 | 2046 | 1616 |
| Stage 2 | 2934 | 2904 |
| Stage 3 | 5435 | 4736 |
| Total | 10415 | 9256 |
| Molar flow rate coolant kmol/h | 3417 | 3249 |
| Cooling water quantity t/h | 2198 | 2096 |

It furthermore is advantageous that the process conditions with regard to the design of the individual plant sections lie within the respective tolerance limits for pressures as well as minimum and maximum temperature, so that when using the coolant according to the invention the same equipment parts can be used as when using propylene as pure coolant. This provides further advantages with regard to the conversion of an already existing plant: It merely is necessary to exchange the coolant used in the compression refrigeration machine.

INDUSTRIAL APPLICABILITY

The invention provides an energetic improvement of a proven method for physical gas scrubbing, which results in savings with regard to the energy costs and a reduced environmental impact. With regard to its hazard potential, the proposed coolant is not worse (propylene) or even better (ammonia) than pure coolants used so far.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value.

When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 to 2 conduit
3 heat exchanger
4 to 10 conduit
11 first compressor stage
12 second compressor stage
13 third compressor stage
14 conduit
15 cooler
16 conduit
17 heat exchanger
18 conduit
19 expansion valve
20 conduit
21 phase separation device
22 to 23 conduit
24 expansion valve
25 conduit
26 heat exchanger
27 to 30 conduit
RG raw gas
PG process gas
A absorber column
R multistage regeneration

The invention claimed is:

1. A process for the separation of undesired gas constituents, comprising carbon dioxide and hydrogen sulfide, from a raw synthesis gas, with methanol as detergent, the process comprising the following steps:
   a) supplying the raw synthesis gas to the absorption apparatus;
   b) cooling a methanol partial stream withdrawn from the absorption apparatus by indirect heat exchange with a coolant in a heat exchanger arranged outside the absorption apparatus thereby producing a cooled methanol partial stream and recirculating the cooled methanol partial stream into the absorption apparatus, wherein the coolant is cooled in a compression refrigeration machine which includes at least one compression stage;
   c) contacting the raw synthesis gas with the cooled methanol partial stream and with at least one further methanol partial stream recirculated from downstream process stages of the absorption apparatus, wherein a process gas stream depleted of undesired gas constituents and a loaded methanol partial stream enriched in undesired gas constituents is obtained;
   d) multistage regeneration of the loaded methanol partial stream by pressure decrease and/or temperature increase, between or downstream of which optionally further absorption steps can be carried out for separating further undesired gas constituents from the process gas stream, wherein at least one regenerated methanol partial stream is obtained, which is recirculated to the step c) and wherein gas streams containing carbon dioxide and hydrogen sulfide are obtained, which are removed from the process;
   wherein the coolant contains 5 to 15 mol-% ethylene, 5 to 15% mol-% n-butane, 30 to 40 mol-% propane and 30 to 60 mol-% propylene.

2. The process according to claim 1, wherein the coolant and the methanol partial stream are arranged in a countercurrent flow in the heat exchanger in the step b).

3. The process according to claim 1, wherein the compression refrigeration machine includes three compression stages in which a compression of the vaporous coolant is effected thereby producing a compressed coolant vapor.

4. The process according to claim 3, wherein the compressed coolant vapor is condensed in a first cooling stage by indirect heat exchange to form a condensate and the condensate is subcooled in a second cooling stage by indirect heat exchange against the gas stream containing carbon dioxide obtained in the step d) thereby forming a subcooled condensate.

5. The process according to claim 4, wherein the subcooled condensate is evaporated or partly evaporated in at least one evaporation stage to produce a coolant vapor, the coolant vapor is further cooled, and the coolant vapor thus further cooled down is used for cooling the methanol partial stream in the step b).

6. The process according to claim 1, wherein the cooled methanol partial stream is cooled to a temperature between −35° C. to −25° C. in the step b).

7. The process according to claim 1, wherein the raw synthesis gas is supplied to the absorption apparatus at a temperature between −5° C. and 0° C. during the step a).

* * * * *